US012679487B2

(12) United States Patent
Alwan et al.

(10) Patent No.: US 12,679,487 B2
(45) Date of Patent: Jul. 14, 2026

(54) METHOD OF ASSEMBLING A VEHICLE

(71) Applicant: Ford Global Technologies, LLC, Dearborn, MI (US)

(72) Inventors: Jamil M. Alwan, Ann Arbor, MI (US); Petros Frantzeskakis, Canton, MI (US); Michael Jon Gutowski, Saline, MI (US); Erik Billimoria, Canton, MI (US); Shawn Michael Morgans, Chelsea, MI (US); Henry W. Hausler, New Hudson, MI (US); Christopher Bondanza, Grosse Pointe Shores, MI (US); Kirk E. Sanborn, Rochester, MI (US); Meghan Hall, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/495,075

(22) Filed: Oct. 26, 2023

(65) Prior Publication Data

US 2025/0136210 A1 May 1, 2025

(51) Int. Cl.
B62D 65/02 (2006.01)
B60K 1/04 (2019.01)
(Continued)

(52) U.S. Cl.
CPC .............. B62D 65/022 (2013.01); B60K 1/04 (2013.01); B62D 25/04 (2013.01); B62D 65/06 (2013.01);
(Continued)

(58) Field of Classification Search
CPC ....... B62D 65/04; B62D 65/02; B62D 65/025
See application file for complete search history.

(56) References Cited

U.S. PATENT DOCUMENTS 5,560,674 A * 10/1996 Tazaki .................. B62D 21/09
296/29
6,131,284 A * 10/2000 Basler .................... B62D 65/04
29/458
(Continued)

FOREIGN PATENT DOCUMENTS

DE 4330559 A1 * 3/1995 ........... B62D 25/082
JP H01182175 A * 7/1989
(Continued)

OTHER PUBLICATIONS

DE-4330559-A1 machine translation (Year: 1995).*
(Continued)

*Primary Examiner* — Michael W Hotchkiss
(74) *Attorney, Agent, or Firm* — Burris Law, PLLC

(57) ABSTRACT

A method of assembling a vehicle that includes performing a first operation on a front vehicle structure, securing a plurality of first vehicle components to the front vehicle structure while performing the first operation on the front vehicle structure, performing a second operation on a rear vehicle structure, securing a plurality of second vehicle components to the rear vehicle structure while performing the second operation on the rear vehicle structure, and coupling the front vehicle structure and the rear vehicle structure to each other to form an intermediate vehicle structure after the first vehicle components have been secured to the front vehicle structure and the second vehicle components have been secured to the rear vehicle structure. The first operation includes continuously or intermittently rotating the front vehicle structure. The second operation includes continuously or intermittently rotating the rear vehicle structure.

19 Claims, 12 Drawing Sheets

(51) Int. Cl.
| | |
|---|---|
| B62D 25/04 | (2006.01) |
| B62D 65/06 | (2006.01) |
| B62D 65/10 | (2006.01) |
| B62D 65/12 | (2006.01) |
| B62D 65/14 | (2006.01) |

(52) U.S. Cl.
CPC ............. B62D 65/10 (2013.01); B62D 65/12 (2013.01); B62D 65/14 (2013.01); *B60K 2001/0438* (2013.01)

(56) References Cited

U.S. PATENT DOCUMENTS

| | | | | |
|---|---|---|---|---|
| 7,850,226 | B2 * | 12/2010 | Hedderly | B62D 27/023 |
| | | | | 296/193.08 |
| 2005/0116506 | A1 * | 6/2005 | Huang | B62D 63/025 |
| | | | | 296/193.04 |
| 2006/0125290 | A1 * | 6/2006 | Eipper | B62D 25/04 |
| | | | | 296/203.03 |
| 2006/0179629 | A1 * | 8/2006 | Tsujihama | B23P 21/006 |
| | | | | 29/33 P |
| 2008/0069673 | A1 * | 3/2008 | Tsujihama | B66C 13/48 |
| | | | | 29/714 |
| 2008/0190737 | A1 * | 8/2008 | Tsujihama | G05B 19/41895 |
| | | | | 198/411 |
| 2017/0305253 | A1 * | 10/2017 | Perlo | B62D 21/152 |
| 2018/0229788 | A1 * | 8/2018 | Erlacher | B62D 65/024 |
| 2019/0152548 | A1 | 5/2019 | Shimizu | |
| 2020/0148292 | A1 * | 5/2020 | Hosbach | B62D 65/04 |
| 2022/0363328 | A1 | 11/2022 | Xin et al. | |
| 2023/0242195 | A1 * | 8/2023 | Beals | B62D 25/08 |
| | | | | 180/65.1 |

FOREIGN PATENT DOCUMENTS

| | | | | | |
|---|---|---|---|---|---|
| JP | H04224472 | A | * | 8/1992 | |
| JP | H04334667 | A | * | 11/1992 | |
| JP | H04356290 | A | * | 12/1992 | |
| JP | H0656053 | A | * | 3/1994 | |
| JP | H0648317 | A | * | 10/1995 | |
| JP | 2986241 | B2 | * | 12/1999 | |
| RU | 2433057 | C1 | * | 11/2011 | |
| WO | 2022006381 | | | 1/2022 | |
| WO | WO-2022055623 | A1 | * | 3/2022 | B62D 21/12 |

OTHER PUBLICATIONS

JPH04224472A machine translation (Year: 1992).*
RU-2433057-C1 machine translation (Year: 2011).*
JPH0648317A description translation retrieved from Google Patents (Year: 1995).*
JPH04334667A description translation retrieved from Google Patents (Year: 1992).*
JP2986241B2 description translation retrieved from Google Patents (Year: 1999).*
JPH0656053A description translation retrieved from Google Patents (Year: 1994).*
JP-H01182175-A Translation (Year: 1989).*
JP-H04356290-A Translation (Year: 1992).*

* cited by examiner

METHOD OF ASSEMBLING A VEHICLE

FIELD

The present disclosure relates to a method for assembling a vehicle, and more specifically, a method for assembling an electric vehicle.

BACKGROUND

The statements in this section merely provide background information related to the present disclosure and may not constitute prior art.

Conventional vehicle assembly processes are typically linear processes that involves sequential build of a vehicle body structure referred to as Body in White, followed by painting the body structure, and then securing vehicle components such as a power train assembly, suspension assemblies, and an instrument panel assembly, for example, to a vehicle structure (e.g., uni-body structure) as the vehicle structure moves along an assembly line. Assembly of vehicle components to the vehicle structure may be slowed down due to restricted access to the vehicle structure at different points along the assembly line.

The present disclosure addresses these issues related to the access to the vehicle structure to secure vehicle components thereto as the vehicle structure moves along the assembly line.

SUMMARY

This section provides a general summary of the disclosure and is not a comprehensive disclosure of its full scope or all of its features.

In one form, the present disclosure discloses a method of assembling a vehicle that includes performing a first operation on a front vehicle structure, securing a plurality of first vehicle components to the front vehicle structure while performing the first operation on the front vehicle structure, performing a second operation on a rear vehicle structure, securing a plurality of second vehicle components to the rear vehicle structure while performing the second operation on the rear vehicle structure, and coupling the front vehicle structure and the rear vehicle structure to each other to form an intermediate vehicle structure after the first vehicle components have been secured to the front vehicle structure and the second vehicle components have been secured to the rear vehicle structure. The first operation includes continuously or intermittently rotating the front vehicle structure. The second operation includes continuously or intermittently rotating the rear vehicle structure.

In variations to the method of the above paragraph, which can be implemented individually or in any combination: the plurality of first vehicle components include a front suspension assembly, an instrument panel structure, a front motor and a front subframe; the plurality of second vehicle components include a rear motor and a rear subframe; the front vehicle structure includes a left first pillar and a right first pillar; the rear vehicle structure defines a left door opening and a right door opening and includes a left second pillar that partially defines the left door opening and a right second pillar that partially defines the right door opening, coupling the front vehicle structure and the rear vehicle structure includes securing the left first pillar and the left second pillar to each other and securing the right first pillar and the right second pillar to each other; painting the front vehicle structure before the first vehicle components are secured thereto; painting the rear vehicle structure before the second vehicle components are secured thereto; the front vehicle structure is rotated using a first robot platform and the rear vehicle structure is rotated using a second robot platform; rotating the front vehicle structure includes rotating the front vehicle structure up to 360 degrees and rotating the rear vehicle structure includes rotating the rear vehicle structure up to 360 degrees; coupling a floor and battery assembly to the front vehicle structure and the rear vehicle structure after the front vehicle structure and the rear vehicle structure are coupled to each other; coupling a plurality of doors to the intermediate vehicle structure after the floor and battery assembly is coupled to the front vehicle structure and the rear vehicle structure; and securing the first vehicle components to the front vehicle structure and securing the second vehicle components to the rear vehicle structure include simultaneously securing the first vehicle components to the front vehicle structure and securing the second vehicle components to the rear vehicle structure.

In another form, the present disclosure discloses a method of assembling a vehicle that includes performing a first operation on a front vehicle structure, securing a plurality of first vehicle components to the front vehicle structure while performing the first operation on the front vehicle structure, performing a second operation on a rear vehicle structure, securing a plurality of second vehicle components to the rear vehicle structure while performing the second operation on the rear vehicle structure, coupling the front vehicle structure and the rear vehicle structure to each other to form an intermediate vehicle structure after the first vehicle components have been secured to the front vehicle structure and the second vehicle components have been secured to the rear vehicle structure; and coupling a floor and battery assembly to the front vehicle structure and the rear vehicle structure after the front vehicle structure and the rear vehicle structure are coupled to each other. The first operation includes continuously rotating the front vehicle structure. The front vehicle structure is permitted to rotate up to 360 degrees. The second operation includes continuously rotating the rear vehicle structure. The rear vehicle structure is permitted to rotate up to 360 degrees.

In variations to the method of the above paragraph, which can be implemented individually or in any combination: the plurality of first vehicle components include a front suspension assembly, an instrument panel structure, a front motor and a front subframe; the plurality of second vehicle components include a rear motor and a rear subframe; painting the front vehicle structure before the first vehicle components are secured thereto; painting the rear vehicle structure before the second vehicle components are secured thereto; the front vehicle structure includes a left first pillar and a right first pillar; the rear vehicle structure defines a left door opening and a right door opening and includes a left second pillar that partially defines the left door opening and a right second pillar that partially defines the right door opening, coupling the front vehicle structure and the rear vehicle structure includes extending first fasteners and adhesive-coated shear studs through the left first pillar and the left second pillar and extending second fasteners and adhesive-coated shear studs through the right first pillar and the right second pillar; the front vehicle structure is rotated using a first robot platform and the rear vehicle structure is rotated using a second robot platform; and coupling a plurality of doors to the intermediate vehicle structure after the floor and battery assembly is coupled to the front vehicle structure and the rear vehicle structure.

In yet another form, the present disclosure discloses a method of assembling a vehicle that includes performing a first operation on a front vehicle structure, securing a plurality of first vehicle components to the front vehicle structure while performing the first operation on the front vehicle structure, performing a second operation on a rear vehicle structure, securing a plurality of second vehicle components to the rear vehicle structure while performing the second operation on the rear vehicle structure, coupling the front vehicle structure and the rear vehicle structure to each other to form an intermediate vehicle structure after the first vehicle components have been secured to the front vehicle structure and the second vehicle components have been secured to the rear vehicle structure; coupling a floor and battery assembly to the front vehicle structure and the rear vehicle structure after the front vehicle structure and the rear vehicle structure are coupled to each other; and coupling a plurality of doors to the intermediate vehicle structure after the floor and battery assembly is coupled to the front vehicle structure and the rear vehicle structure. The first operation includes continuously or intermittently rotating the front vehicle structure. The front vehicle structure includes a left first pillar and a right first pillar. The second operation includes continuously or intermittently rotating the rear vehicle structure. The rear vehicle structure defines a left door opening and a right door opening and includes a left second pillar that partially defines the left door opening a right second pillar that partially defines the right door opening. Coupling the front vehicle structure and the rear vehicle structure includes securing the left first pillar and the left second pillar to each other and securing the right first pillar and the right second pillar to each other.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
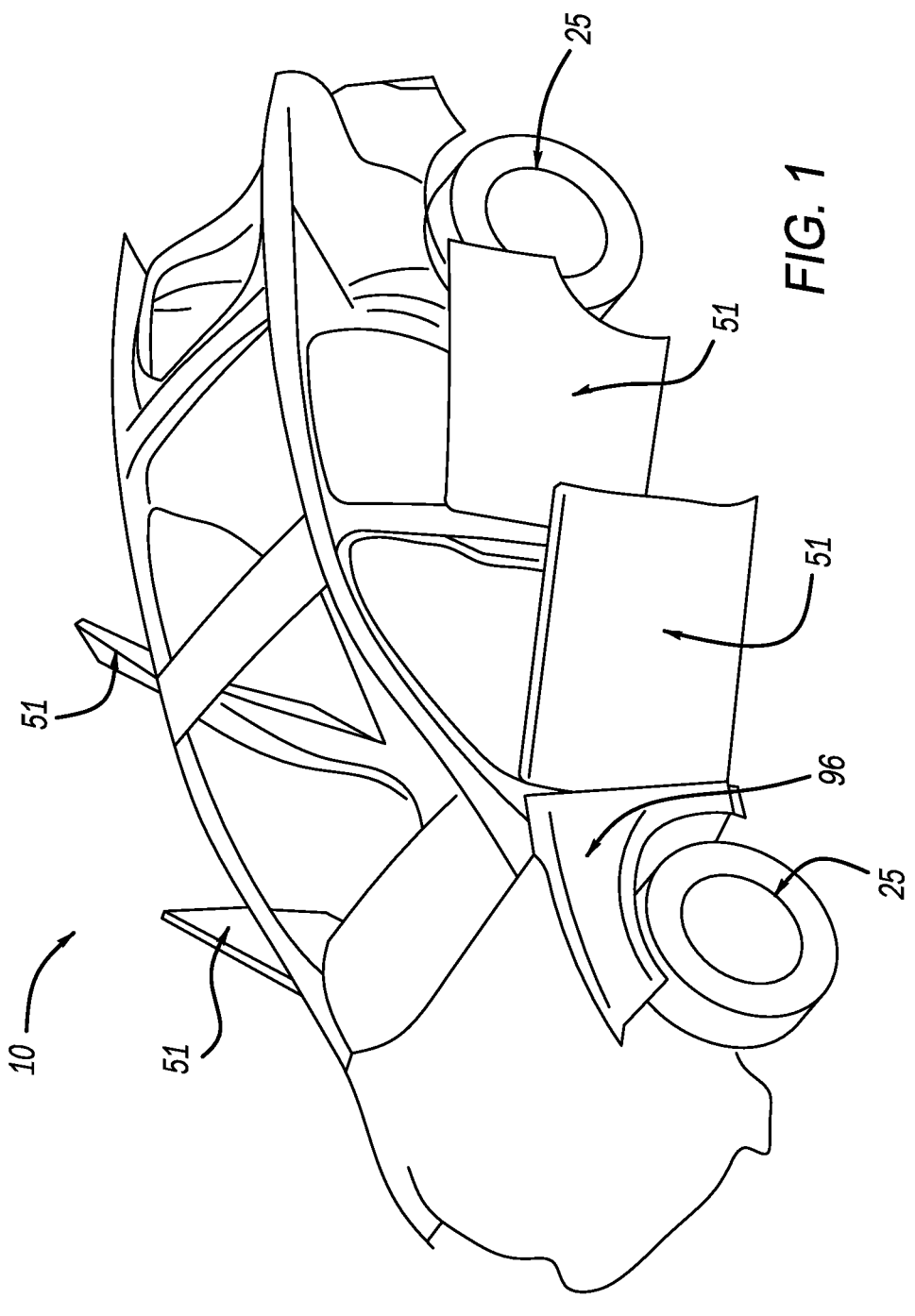
FIG. 1 is a perspective view of a portion of a vehicle including a front vehicle structure and a rear vehicle structure according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. In still other examples, the vehicle 10 may be an internal combustion engine driven vehicle.

Figure 2:
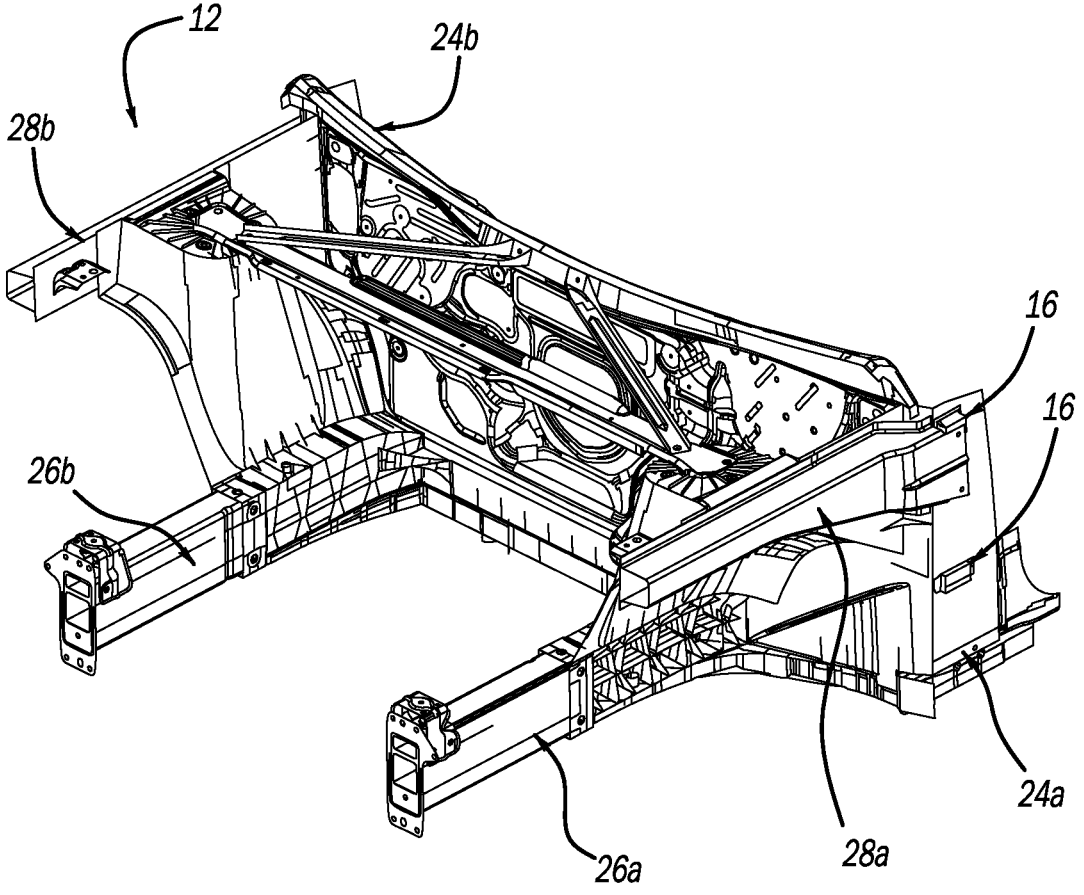
FIG. 2 is a perspective view of the front vehicle structure of the vehicle of FIG. 1 with vehicle components removed therefrom for clarity.
Figure 5:
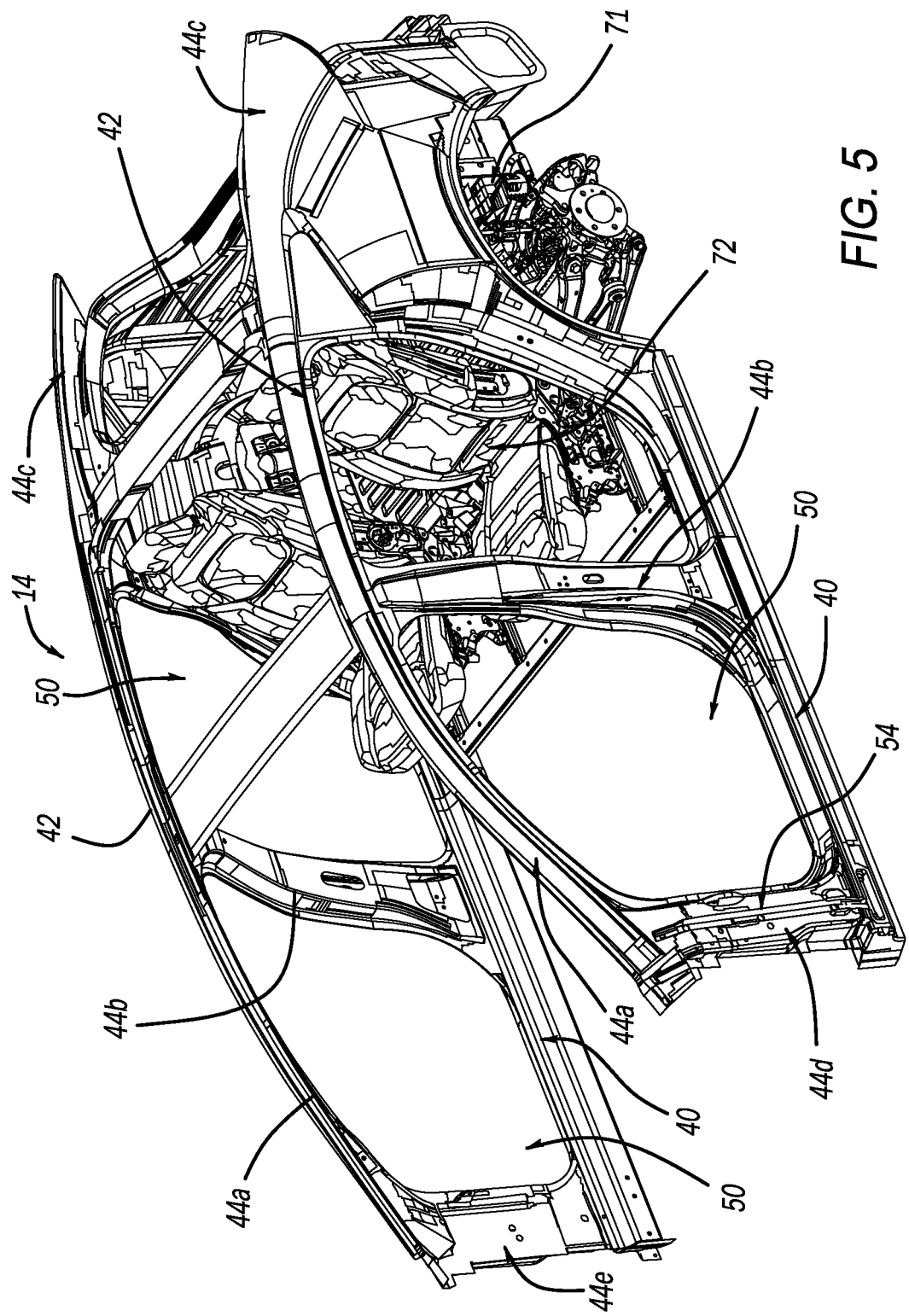
FIG. 5 is a perspective view of the rear vehicle structure of the vehicle of FIG. 1 with vehicle components secured thereto.
Figure 7A:
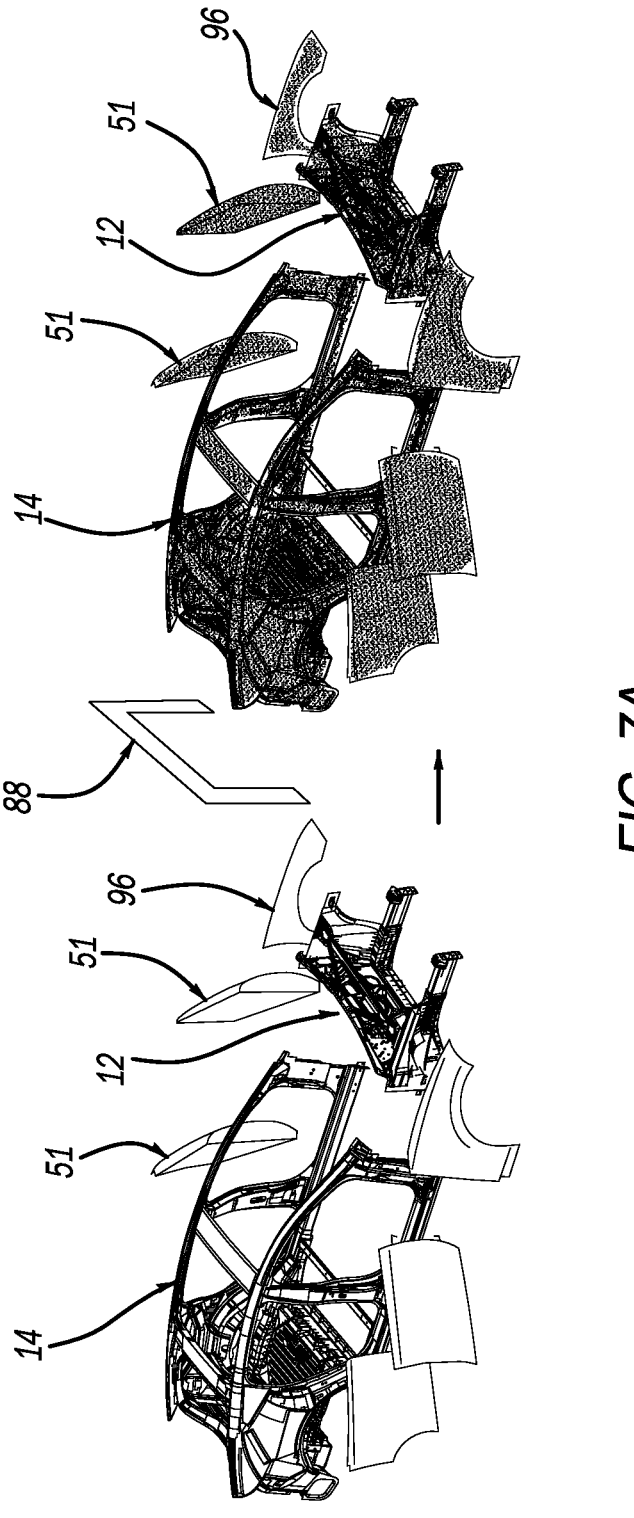
FIGS. 7A-7F are perspective views of the vehicle of FIG. 1 being assembled according to the principles of the present disclosure.
Figure 7B:
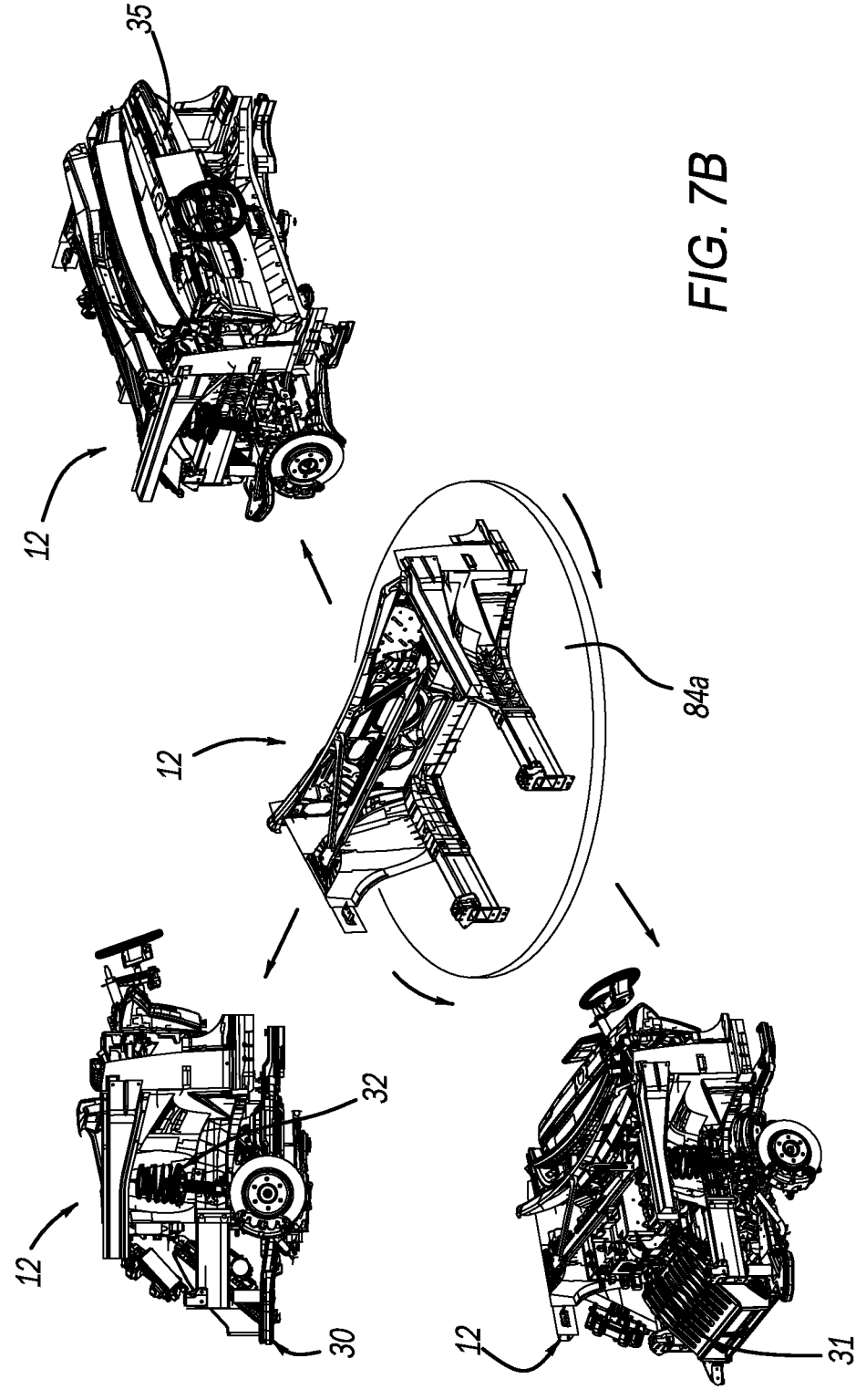
Figure 7C:
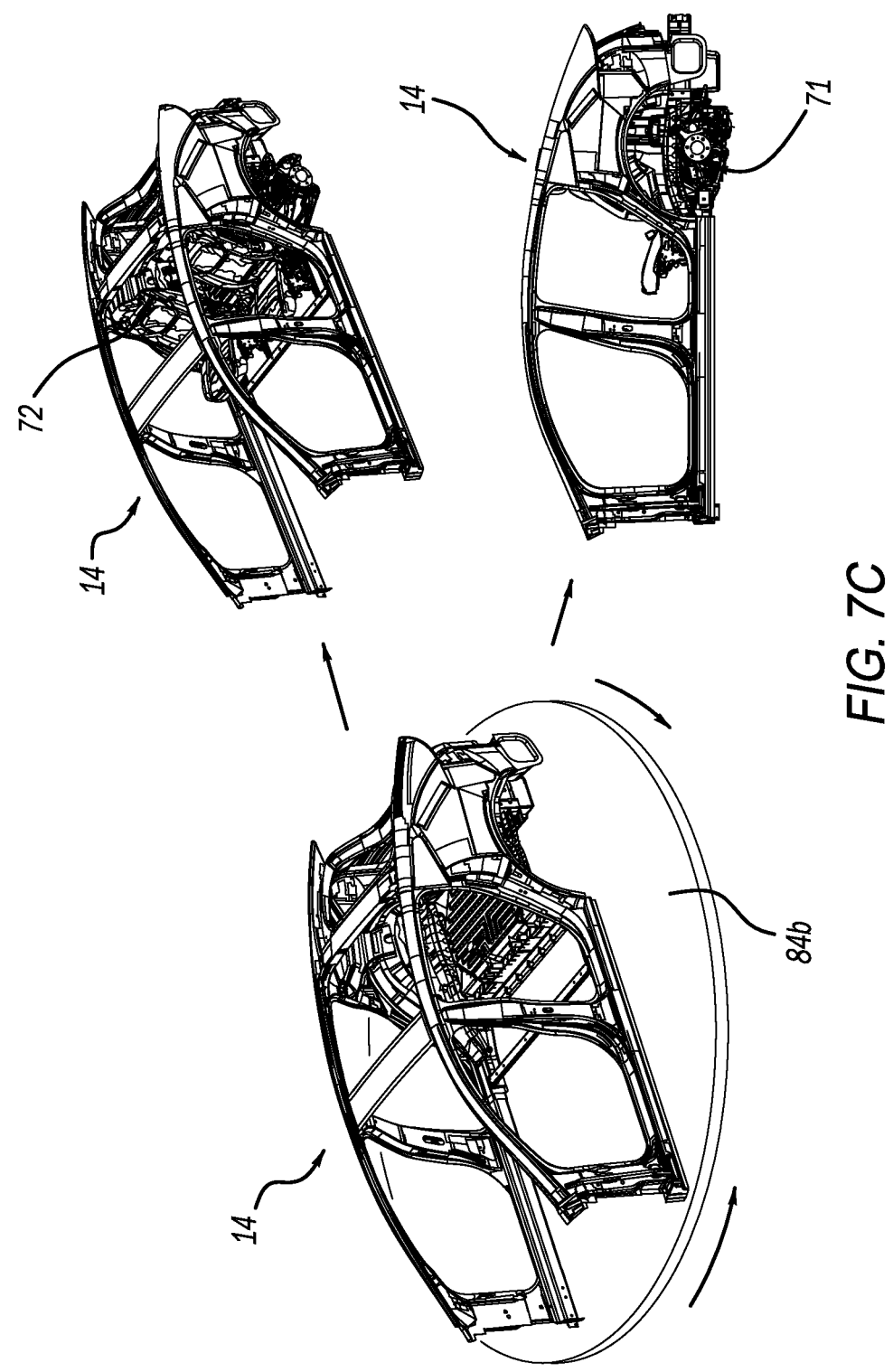
Figure 7D:
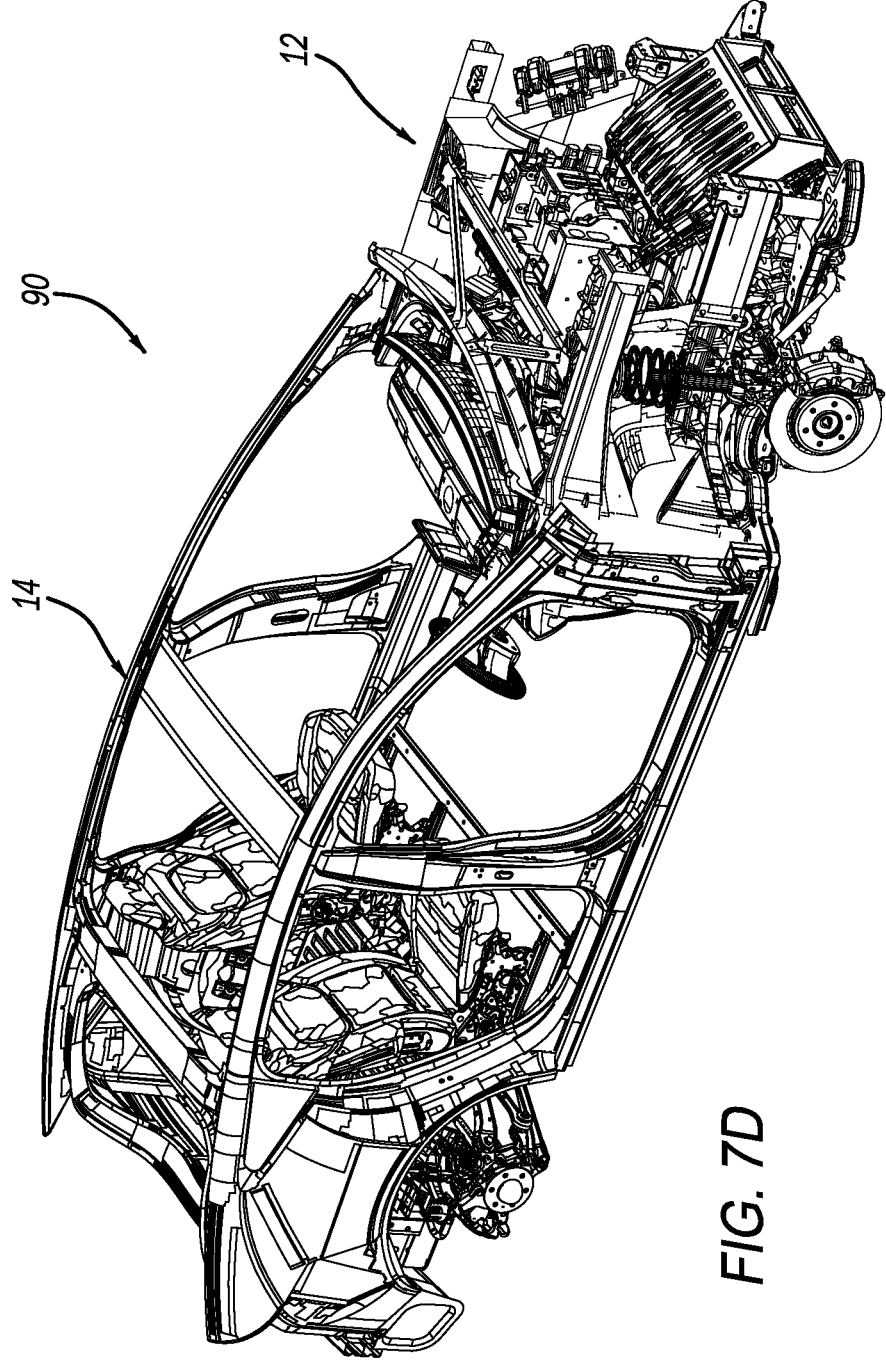
Figure 7E:
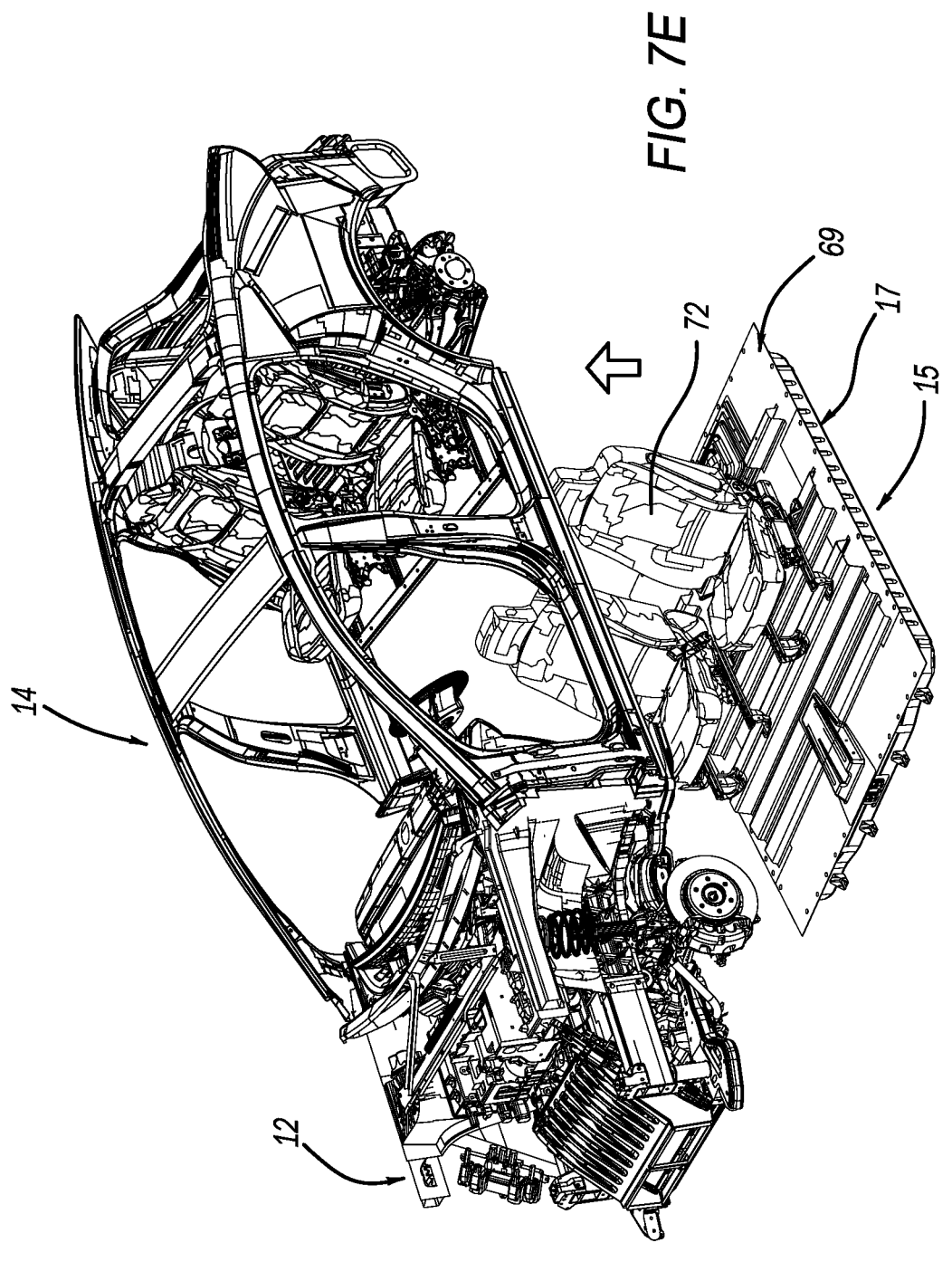

With additional reference to FIGS. 2, 5, and 7E the vehicle 10 includes a front vehicle structure 12 (FIGS. 2 and 7E), a rear vehicle structure 14 (FIGS. 5 and 7E), and a floor and battery assembly 15 (FIG. 7E). The front vehicle structure 12 is located closer toward a front of the vehicle 10 than the rear vehicle structure 14 and is coupled to the rear vehicle structure 14 as described in more detail below. In one example, the front vehicle structure 12 is manufactured using a plurality of stamped parts that are secured to each other, e.g., via welding, adhesive, or fasteners. In another example, the front vehicle structure 12 is manufactured using a casting process. With reference to FIG. 2, the front vehicle structure 12 includes, inter alia, a pair of hinge pillars 24a, 24b, a pair of inner rails 26a, 26b, a pair of upper rails 28a, 28b, and a bumper (not shown). Each inner rail 26a, 26b extends from a lower portion of a respective hinge pillar 24a, 24b to the bumper. Each inner rail 26a, 26b can also be arcuate and extend around a front wheel 25 (FIG. 1) of the vehicle 10 and form a portion of a respective front wheel well. The upper rails 28a, 28b are positioned above the pair of inner rails 26a, 26b and extend from an upper portion of a respective hinge pillar 24a, 24b toward a front of the vehicle 10. The bumper extends in a transverse direction relative to a longitudinal direction of the vehicle 10 and is secured to front ends of the pair of inner rails 26a, 26b.

Figure 3:
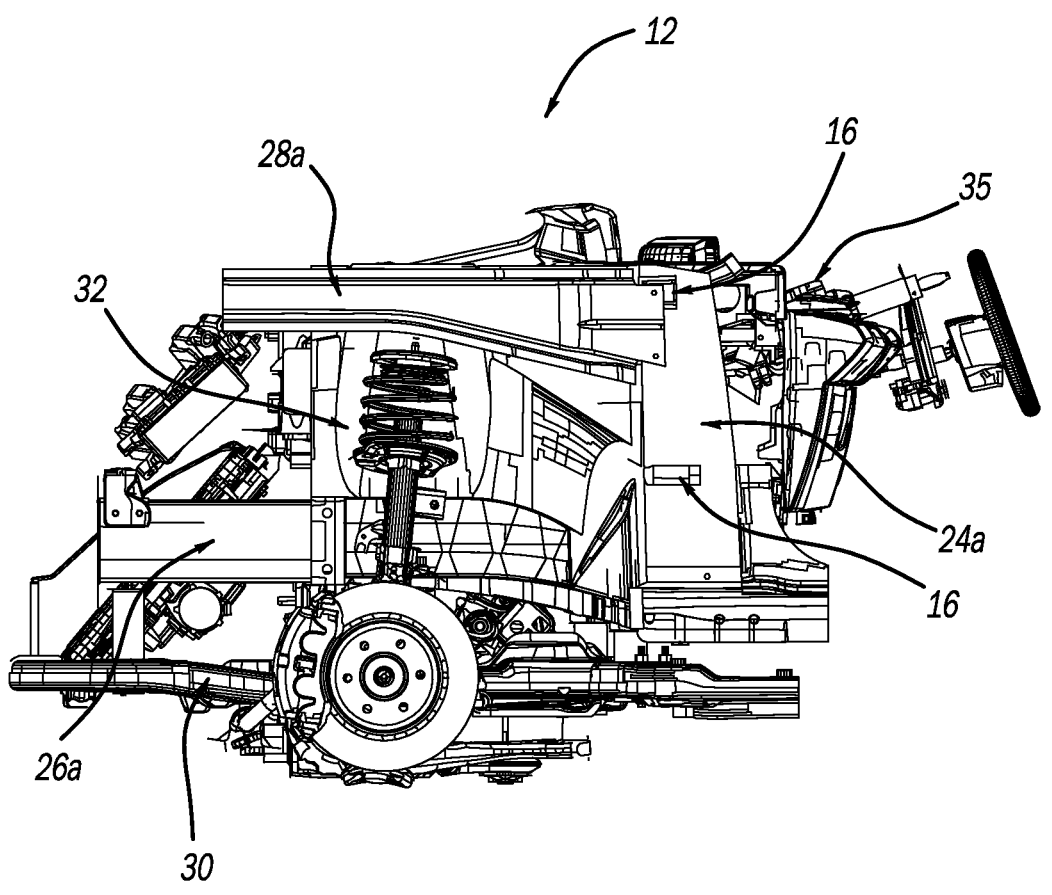
FIG. 3 is a side view of the front vehicle structure of the vehicle of FIG. 1 with vehicle components secured thereto.
Figure 4:
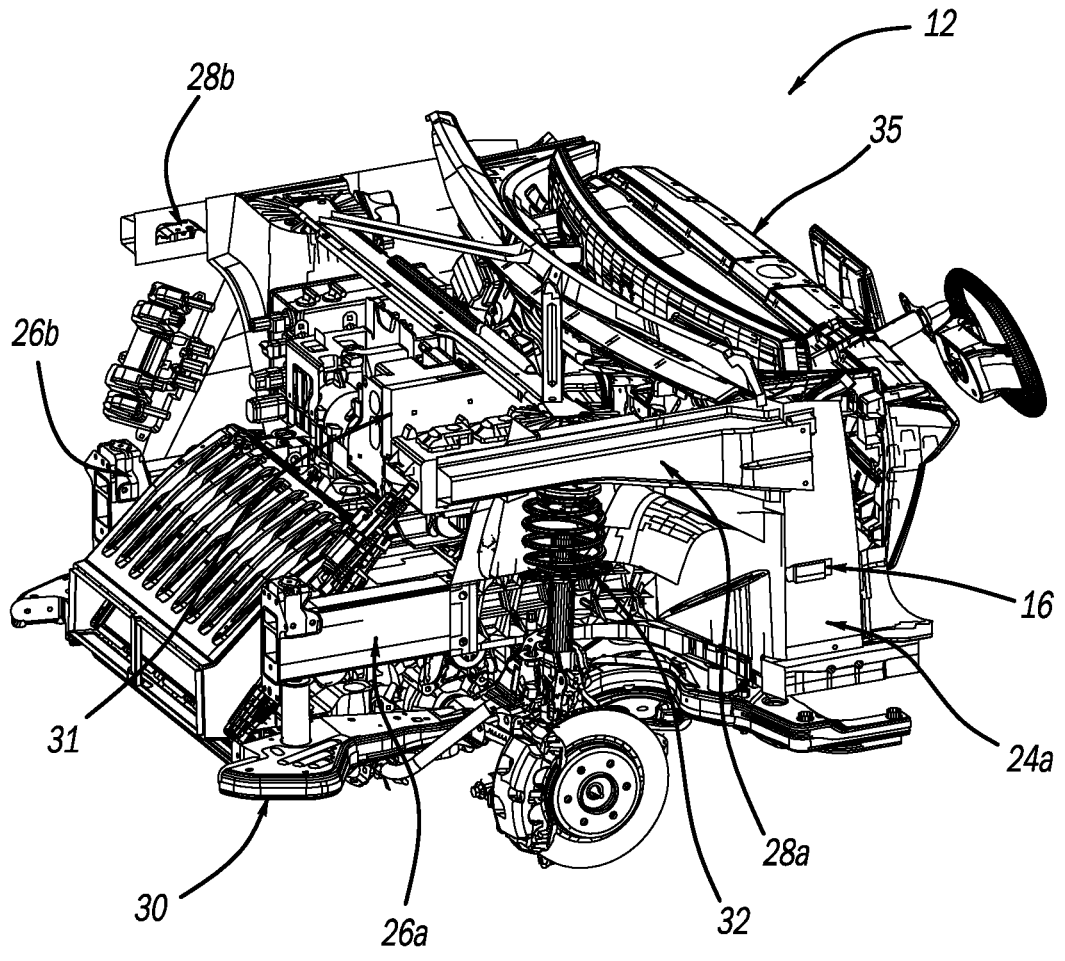
FIG. 4 is a perspective view of the front vehicle structure of the vehicle of FIG. 1 with vehicle components secured thereto.

With reference to FIGS. 3 and 4, a front subframe 30 is positioned below the front vehicle structure 12 and is secured to the pair of inner rails 26a, 26b of the front vehicle structure 12. The front subframe 30 may support one or more components of the vehicle 10 such as a front motor 31 (FIG. 4) and front suspension components 32 that may also be coupled to the front vehicle structure 12. The front motor 31 is powered by a battery pack 17 (FIG. 7E) of the floor and battery assembly 15 to selectively drive a set of front wheels 25 (FIG. 1; only one wheel shown in the figure). The front suspension components 32 provide a smooth ride by absorbing energy from various road bumps while driving. The front suspension components 32 may include upper and lower control arms, springs, shock absorbers, struts, and ball joints, for example. It should also be understood that other components may be coupled to the front vehicle structure 12 such as an instrument panel structure 35 and electronics (e.g., inverters, AC-DC converter, and DC-DC converter).

Figure 6:
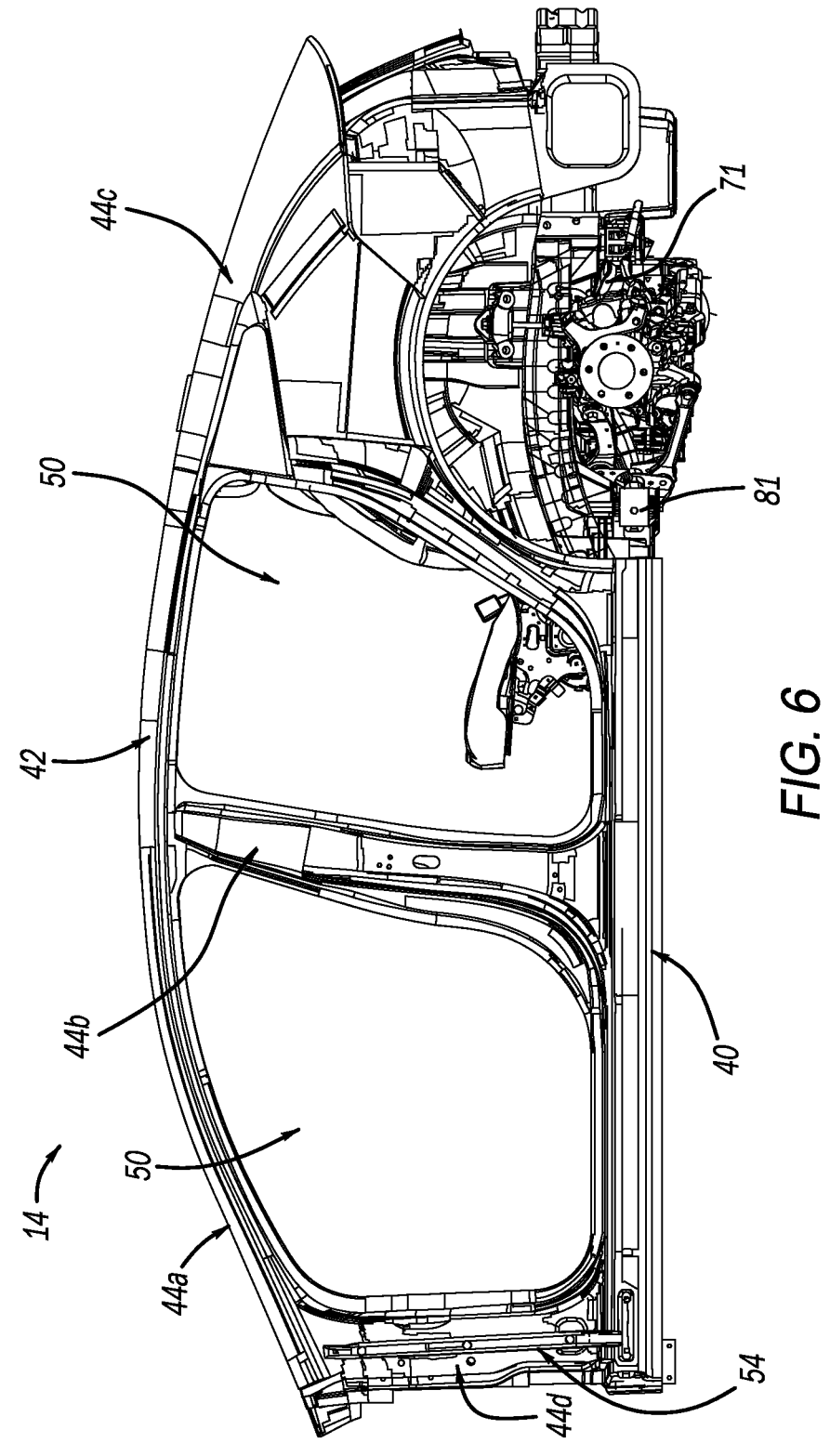
FIG. 6 is a side view of the rear vehicle structure of the vehicle of FIG. 1 with vehicle components secured thereto.

With reference to FIGS. 5 and 6, the rear vehicle structure 14 includes rockers 40, roof side rails 42, and a plurality of pillars (e.g., a pair of front pillars 44a, a pair of middle pillars 44b, a pair of rear pillars 44c and a pair of hinge pillars 44d, 44e). The rockers 40 extend lengthwise in a longitudinal direction of the vehicle 10 and may be config-
ured to mount the battery pack 17 to the rear vehicle
structure 14. Each rocker 40 is made of a metal material such
as aluminum, for example, and may be secured to a respec-
tive side of the battery pack 17 using fasteners, adhesives,
welding, or any other suitable attachment means, for
example.

Each roof side rail 42 is positioned at a side of the rear
vehicle structure 14 and extends along the longitudinal
direction of the vehicle 10. Each roof side rail 42 includes
one or more structural members extending along the longi-
tudinal direction of the vehicle 10. Each front pillar 44*a*
extends in the longitudinal direction of the vehicle 10 from
a respective roof side rail 42 to a respective hinge pillar 44*d*,
44*e*. Each middle pillar 44*b* extends in a vertical direction from a respective roof side rail 42 to a respective rocker 40.
Each rear pillar 44*c* extends toward a rear of the vehicle 10
from an end of a respective roof side rail 42. The front pillars
44*a*, the middle pillars 44*b*, the hinge pillars 44*d*, 44*e*, the
rockers 40 and the roof side rails 42 cooperate to define door
openings 50 in the rear vehicle structure 14. Doors 51 are
rotatably coupled to the rear vehicle structure 14 and/or the
front vehicle structure 12 and rotatable between a closed
position in which the doors 51 are disposed within the door
openings 50 and an open position in which the doors 51 are
removed from the door openings 50.

Each hinge pillar 44*d*, 44*e* extends in a vertical direction
from an end of a respective front pillar 44*a* to an end of a
respective rocker 40. In the example illustrated, the hinge
pillar 44*d* is secured to hinge pillar 24*a* of the front vehicle
structure 12 using left attachment structures (not shown) and
left interface blocks 16 and the hinge pillar 44*e* is secured to
hinge pillar 24*b* of the front vehicle structure 12 using right
attachment structures (not shown) and right interface blocks
(not shown). In this way, an intermediate vehicle structure
90 (FIG. 7D) is formed. One example of such attachment
structures and interface blocks are disclosed in the U.S.
Patent Application Ser. No. 18/495,070 and titled
"VEHICLE HAVING FRONT AND REAR VEHICLE
STRUCTURES" which is filed concurrently with this application and is commonly owned with the present application
and the content of which are incorporated herein by refer-
ence in its entirety.

With continued reference to FIGS. 5 and 6, a rear sub-
frame 81 is secured to the rear vehicle structure 14 and may
support one or more components of the vehicle 10 such as
a rear motor 71 that may also be coupled to the rear vehicle
structure 14. The rear motor 71 is powered by the battery
pack 17 to selectively drive rear wheels 25 of a set of rear
wheels. It should also be understood that other components
may be coupled to the rear vehicle structure 14 such as a
vehicle floor 69 (FIG. 7E) of the floor and battery assembly
15, rear suspension components (not specifically shown),
and the battery pack 17. The vehicle floor 69 may support
one or more vehicle seats 72 or rows of seats. The rear
suspension components provide a smooth ride by absorbing
energy from various road bumps while driving. The rear
suspension components may include upper and lower con-
trol arms, springs, shock absorbers, struts, and ball joints, for
example. The battery pack 17 may be rechargeable and may
include lithium-ion batteries or any other suitable electrical
power storage units. The battery pack 17 may be disposed at
and mounted to various locations of the rear vehicle struc-
ture 14. In this way, the battery pack 17 is supported by the
rear vehicle structure 14 and is remote from a passenger
cabin (not shown) and cargo compartments (not shown) of
the vehicle 10, therefore, not occupying space that would otherwise be available for passengers or cargo. One example
of such battery pack is disclosed in U.S. patent application
Ser. No. 17/980,207 titled "STRUCTURAL ASSEMBLY
FOR BATTERY STRUCTURE OF ELECTRIC VEHICLE"
which is commonly owned with the present application and
the contents of which are incorporated herein by reference in
its entirety.

With reference to FIGS. 7A-7F, a method of assembling
of the vehicle 10 will be described in detail. First, as shown
in FIG. 7A, one or more stations 88 are provided for painting
individual or separate parts of the vehicle 10. That is, the
front vehicle structure 12, the rear vehicle structure 14,
fenders 96 and doors 51 of the vehicle 10, for example, are
painted and treated while they are not coupled together. It
should be understood the front vehicle structure 12 is
painted before vehicle components are secured thereto and
the rear vehicle structure 14 is painted before vehicle com-
ponents are secured thereto. Next, as shown in FIG. 7B, the
front vehicle structure 12 is rotated. In the example illus-
trated, the front vehicle structure 12 is disposed on a robot
platform 84*a* that is configured to rotate. The platform 84*a*
may be rotated manually or automatically using a controller
(not shown). In some forms, the front vehicle structure 12
may be supported by or coupled to a robot arm or any other
suitable apparatus that is permitted to rotate the front vehicle
structure 12. It should be understood that the robot platform
84*a* can be configured to rotate the front vehicle structure 12
360 degrees. Vehicle components such as the front subframe
30, the front motor 31, the front suspension components 32,
the instrument panel structure 35, and electronics, for
example, are secured to the front vehicle structure 12 while
the front vehicle structure 12 is on the robot platform 84*a*.
In one example, the front vehicle structure 12 may rotate on
the robot platform 84*a* and may stop at predetermined
angular orientations such that different vehicle components
may be secured thereto. For example, the front vehicle
structure 12 may stop at one angular orientation where one
component (e.g., the front subframe 30) may be secured
thereto at a station (not shown) before rotating and stopping
at another angular orientation where another component
(e.g., the front motor 31) may be secured thereto. This
rotation may occur while the robot platform 84*a* is at one
station or before, after, or while also translating such that the
other component (e.g., the front motor 31) is secured at
another station (not shown) along an assembly line. In
another example, the vehicle components may be secured to
the front vehicle structure 12 at various stations while the
front vehicle structure 12 is continuously rotating on the
robot platform 84*a*. In one form, the robot platform 84*a* may
be sufficiently large enough such that an operator (not
shown) may attach the components while standing on or
near the robot platform 84*a* while it is stationary or while it
is rotating and/or translating.

As shown in FIG. 7C, the rear vehicle structure 14 is also
rotated. In the example illustrated, the rear vehicle structure
14 is disposed on a robot platform 84*b* that is configured to
rotate. The robot platform 84*b* may be rotated manually or
automatically using a controller (not shown). In some forms,
the rear vehicle structure 14 may be supported by or coupled
to a robot arm or any other suitable apparatus that is
permitted to rotate the rear vehicle structure 14. It should be
understood that the robot platform 84*b* can be configured to
rotate the rear vehicle structure 14 360. Vehicle components
such as the rear motor 71, the rear subframe 81, and rear
suspension components, for example, are secured to the rear
vehicle structure 14. In one example, the rear vehicle
structure 14 may rotate on the robot platform 84*b* and may stop at predetermined angular orientations such that the vehicle components may be secured thereto. That is, the rear vehicle structure 14 may stop at one angular orientation where a first component (e.g., the rear subframe 81) may be secured thereto at a station before rotating and stopping at another angular orientation where another component (e.g., the rear motor 71) may be secured thereto. This rotation may occur while the robot platform 84b is at one station or before, after, or while also translating such that the other component (e.g., the rear motor 71) is secured at another station along an assembly line. In another example, the vehicle components may be secured to the rear vehicle structure 14 at various stations while the rear vehicle structure 14 is continuously rotating on the robot platform 84b. In one form, the robot platform 84b may be sufficiently large enough such that an operator (not shown) may attach the components while standing on or near the robot platform 84b while it is stationary or while it is rotating and/or translating. The robot platform 84b may be on a separate assembly line from the robot platform 84a. The vehicle components may be secured to the front vehicle structure 12 at the same time (i.e., simultaneously) that vehicle components are secured to the rear vehicle structure 14, thus, reducing assembly time of the vehicle 10.

Next, as shown in FIG. 7D, the front vehicle structure 12 and the rear vehicle structure 14 are coupled to each other to form the intermediate vehicle structure 90 after the vehicle components have been secured to the front vehicle structure 12 and the vehicle components have been secured to the rear vehicle structure 14. That is, the hinge pillar 44d of the rear vehicle structure 14 is coupled to hinge pillar 24a of the front vehicle structure 12 and the hinge pillar 44e of the rear vehicle structure 14 is coupled to the hinge pillar 24b of the front vehicle structure 12. One example of coupling the front vehicle structure 12 and the rear vehicle structure 14 to each other is disclosed in the U.S. Patent Application Ser. No. 18/495,070 and titled "VEHICLE HAVING FRONT AND REAR VEHICLE STRUCTURES" which is filed concurrently with this application and is commonly owned with the present application and the contents of which are incorporated herein by reference in its entirety.

Next, as shown in FIG. 7E, the floor and battery assembly 15 is coupled to the front and rear vehicle structure 12, 14 after the front and rear vehicle structures 12, 14 have been coupled to each other. That is, the floor and battery assembly 15 is inserted from a bottom of the intermediate vehicle structure 90 and is coupled to the intermediate vehicle structure 90. Components such as seats 72 may optionally be attached to the floor 69 before coupling the floor and battery assembly 15 to the intermediate vehicle structure 90 such that these components attached to the floor 69 are inserted from the bottom of the intermediate vehicle structure 90.

Figure 7F:
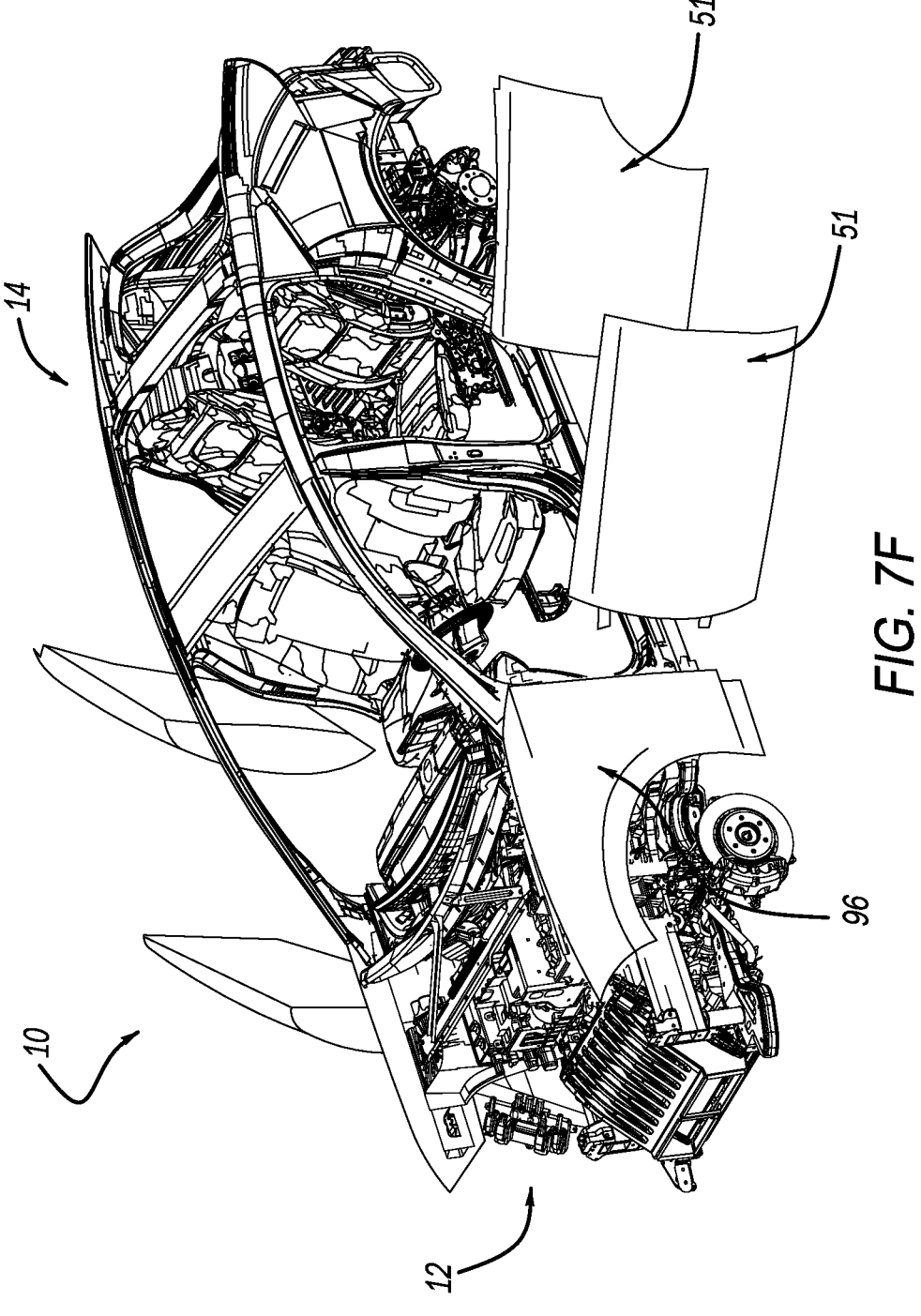

Next, as shown in FIG. 7F, the doors 51 and fenders 96 are coupled to the intermediate vehicle structure 90 after the floor and battery assembly 15 is coupled to the intermediate vehicle structure 90. In some forms, the fenders 96 are coupled to the intermediate vehicle structure 90 before or at the same time as the floor and battery assembly 15 being coupled to the intermediate vehicle structure 90. It should be understood that any remaining components of the vehicle 10 such as wheels, a vehicle trunk, a vehicle hood, or additional electronics, for example, may be coupled to the vehicle 10 prior to the vehicle 10 being removed from the assembly line.

The vehicle 10 of the present disclosure provides that the front and rear vehicle structures 12, 14 are secured to each other at the hinge pillars 24a, 24b, 44e, 44f after each vehicle structure 12, 14 has been built up. That is, the front vehicle structure 12 is accessible from multiple sides and areas, including from a rear of the front vehicle structure 12, to secure one or more vehicle components thereto during the assembly process. Similarly, the rear vehicle structure 14 is accessible from multiple sides and areas, including from a front of the rear vehicle structure 14, to secure one or more vehicle components thereto during the assembly process. After the front and rear vehicle structures 12, 14 have been built up, the front and rear structures 12, 14 are conveniently secured to each other followed by securing the remaining components (e.g., floor and battery assembly 15, doors 51, fenders 96) to the front and rear vehicle structures 12, 14. In this way, the assembly process of the vehicle 10 is enhanced.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of assembling a vehicle, the method comprising:

performing a first operation on a front vehicle structure, the first operation including continuously or intermittently rotating the front vehicle structure, the front vehicle structure includes a left hinge pillar and a right hinge pillar;

securing a plurality of first vehicle components to the front vehicle structure while performing the first operation on the front vehicle structure;

performing a second operation on a rear vehicle structure, the second operation including continuously or intermittently rotating the rear vehicle structure, the rear vehicle structure defining a left door opening and a right door opening and including a left hinge pillar that partially defines the left door opening and a right hinge pillar that partially defines the right door opening;

securing a plurality of second vehicle components to the rear vehicle structure while performing the second operation on the rear vehicle structure;

coupling the front vehicle structure and the rear vehicle structure to each other to form an intermediate vehicle structure after the first vehicle components have been secured to the front vehicle structure and the second vehicle components have been secured to the rear vehicle structure; and coupling a floor and battery assembly to the front vehicle structure and the rear vehicle structure after the front vehicle structure and the rear vehicle structure are coupled to each other, wherein coupling the front vehicle structure and the rear vehicle structure includes coupling an interface block on an outermost lateral side of the left hinge pillar of the front vehicle structure to a corresponding channel in the left hinge pillar of the rear vehicle structure and coupling an interface block on an outermost lateral side of the right hinge pillar of the front vehicle structure to a corresponding channel in the right hinge pillar of the rear vehicle structure.

2. The method of claim 1, wherein the plurality of second vehicle components include a rear motor and a rear subframe.

3. The method of claim 1, further comprising:

painting the front vehicle structure before the first vehicle components are secured thereto; and painting the rear vehicle structure before the second vehicle components are secured thereto.

4. The method of claim 1, wherein the front vehicle structure is rotated using a first robot platform and the rear vehicle structure is rotated using a second robot platform.

5. The method of claim 1, wherein rotating the front vehicle structure includes rotating the front vehicle structure up to 360 degrees and rotating the rear vehicle structure includes rotating the rear vehicle structure up to 360 degrees.

6. The method of claim 1, further comprising coupling a plurality of doors to the intermediate vehicle structure after the floor and battery assembly is coupled to the front vehicle structure and the rear vehicle structure.

7. The method of claim 1, wherein securing the first vehicle components to the front vehicle structure and securing the second vehicle components to the rear vehicle structure include simultaneously securing the first vehicle components to the front vehicle structure and securing the second vehicle components to the rear vehicle structure.

8. The method of claim 1, wherein the rear vehicle structure further includes a right front pillar, a left front pillar, a right rocker and a left rocker, and wherein the left hinge pillar of the rear vehicle structure connects the left front pillar and the left rocker and the right hinge pillar of the rear vehicle structure connects the right front pillar and the right rocker.

9. The method of claim 1, wherein the plurality of first vehicle components include a front suspension assembly, an instrument panel structure, a front motor and a front subframe.

10. The method of claim 9, wherein the plurality of second vehicle components include a rear motor and a rear subframe.

11. A method of assembling a vehicle, the method comprising:

performing a first operation on a front vehicle structure, the first operation including continuously rotating the front vehicle structure, the front vehicle structure permitted to rotate up to 360 degrees, the front vehicle structure includes a left hinge pillar and a right hinge pillar;

securing a plurality of first vehicle components to the front vehicle structure while performing the first operation on the front vehicle structure;

performing a second operation on a rear vehicle structure, the second operation including continuously rotating the rear vehicle structure, the rear vehicle structure permitted to rotate up to 360 degrees, the rear vehicle structure defining a left door opening and a right door opening and including a left hinge pillar that partially defines the left door opening and a right hinge pillar that partially defines the right door opening;

securing a plurality of second vehicle components to the rear vehicle structure while performing the second operation on the rear vehicle structure;

coupling the front vehicle structure and the rear vehicle structure to each other to form an intermediate vehicle structure after the first vehicle components have been secured to the front vehicle structure and the second vehicle components have been secured to the rear vehicle structure; and coupling a floor and battery assembly to the front vehicle structure and the rear vehicle structure after the front vehicle structure and the rear vehicle structure are coupled to each other, wherein coupling the front vehicle structure and the rear vehicle structure includes coupling an interface block on an outermost lateral side of the left hinge pillar of the front vehicle structure to a corresponding channel in the left hinge pillar of the rear vehicle structure and coupling an interface block on an outermost lateral side of the right hinge pillar of the front vehicle structure to a corresponding channel in the right hinge pillar of the rear vehicle structure.

12. The method of claim 11, wherein the plurality of second vehicle components include a rear motor and a rear subframe.

13. The method of claim 11, further comprising:

painting the front vehicle structure before the first vehicle components are secured thereto; and painting the rear vehicle structure before the second vehicle components are secured thereto.

14. The method of claim 11, wherein coupling the front vehicle structure and the rear vehicle structure includes extending a plurality of first fasteners through the left hinge pillar of the front vehicle structure and the left hinge pillar of the rear vehicle structure and extending a plurality of second fasteners through the right hinge pillar of the front vehicle structure and the right hinge pillar of the rear vehicle structure.

15. The method of claim 11, wherein the front vehicle structure is rotated using a first robot platform and the rear vehicle structure is rotated using a second robot platform.

16. The method of claim 11, further comprising coupling a plurality of doors to the intermediate vehicle structure after the floor and battery assembly is coupled to the front vehicle structure and the rear vehicle structure.

17. The method of claim 11, wherein the plurality of first vehicle components include a front suspension assembly, an instrument panel structure, a front motor and a front subframe.

18. The method of claim 17, wherein the plurality of second vehicle components include a rear motor and a rear subframe.

19. A method of assembling an electric vehicle, the method comprising:

performing a first operation on a front vehicle structure, the first operation including continuously or intermittently rotating the front vehicle structure, the front vehicle structure includes a left hinge pillar and a right hinge pillar;

securing a plurality of first vehicle components to the front vehicle structure while performing the first operation on the front vehicle structure;

performing a second operation on a rear vehicle structure, the second operation including continuously or intermittently rotating the rear vehicle structure, the rear vehicle structure defining a left door opening and a right door opening and including a left hinge pillar that partially defines the left door opening and a right hinge pillar that partially defines the right door opening;

securing a plurality of second vehicle components to the rear vehicle structure while performing the second operation on the rear vehicle structure;

coupling the front vehicle structure and the rear vehicle structure to each other to form an intermediate vehicle structure after the first vehicle components have been secured to the front vehicle structure and the second vehicle components have been secured to the rear vehicle structure, coupling the front vehicle structure and the rear vehicle structure includes coupling an interface block on an outermost lateral side of the left hinge pillar of the front vehicle structure to a corresponding channel in the left hinge pillar of the rear vehicle structure and coupling an interface block on an outermost lateral side of the right hinge pillar of the front vehicle structure to a corresponding channel in the right hinge pillar of the rear vehicle structure;

coupling a floor and battery assembly to the front vehicle structure and the rear vehicle structure after the front vehicle structure and the rear vehicle structure are coupled to each other; and coupling a plurality of doors to the intermediate vehicle structure after the floor and battery assembly is coupled to the front vehicle structure and the rear vehicle structure.

* * * * *